July 9, 1963

P. M. BRYANT 3,096,617

COMBINED NOISE SUPPRESSOR, THRUST REVERSER AND VARIABLE
AREA NOZZLE FOR EXHAUST EXIT SYSTEM FOR JET ENGINES

Filed Nov. 8, 1960

*INVENTOR.*
PAUL M. BRYANT

BY

*R.E. Geangue*

ATTORNEY

July 9, 1963
P. M. BRYANT
3,096,617
COMBINED NOISE SUPPRESSOR, THRUST REVERSER AND VARIABLE
AREA NOZZLE FOR EXHAUST EXIT SYSTEM FOR JET ENGINES
Filed Nov. 8, 1960
3 Sheets-Sheet 2
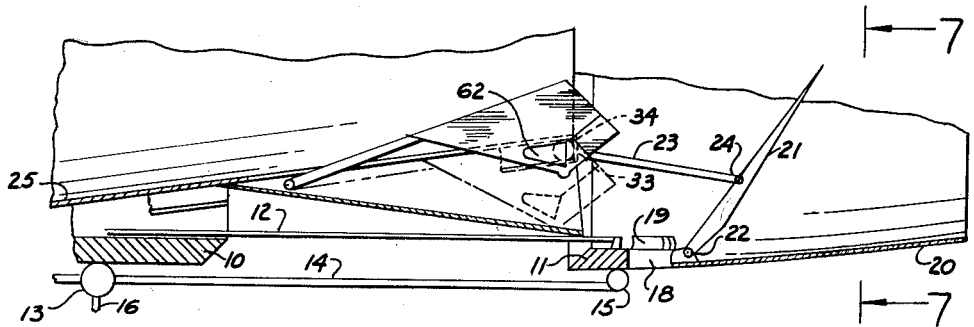
FIG. 4
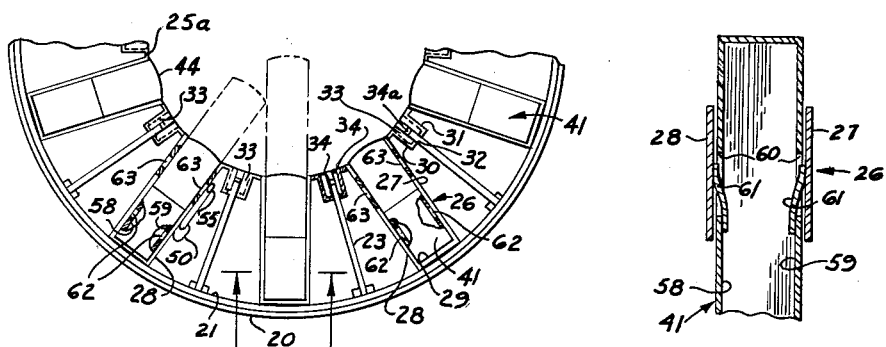
FIG. 5
FIG. 6
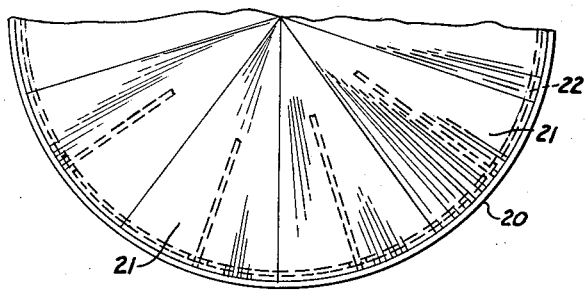
FIG. 7
INVENTOR.
PAUL M. BRYANT
BY
ATTORNEY July 9, 1963  P. M. BRYANT  3,096,617
COMBINED NOISE SUPPRESSOR, THRUST REVERSER AND VARIABLE
AREA NOZZLE FOR EXHAUST EXIT SYSTEM FOR JET ENGINES
Filed Nov. 8, 1960  3 Sheets-Sheet 3

INVENTOR.
PAUL M. BRYANT
BY
R. E. Geaugue
ATTORNEY

_United States Patent Office_

3,096,617
Patented July 9, 1963

3,096,617
COMBINED NOISE SUPPRESSOR, THRUST REVERSER AND VARIABLE AREA NOZZLE FOR EXHAUST EXIT SYSTEM FOR JET ENGINES
Paul M. Bryant, Sherman Oaks, Calif., assignor to The Marquardt Corporation, Van Nuys, Calif., a corporation of California
Filed Nov. 8, 1960, Ser. No. 67,951
7 Claims. (Cl. 60—35.54)

This invention relates to a combined retractable noise suppressor, thrust reverser and variable area noozle for a jet engine and, more particularly, to the utilization of retractable noise suppressor elements and movable thrust reversing blockage segments to obtain desired conditions of operation of jet engines.

At present, noise suppression is developed by Greatrex lobes which are arranged into a stationary convoluted exhaust nozzle. The noise suppression results from the breaking up of the exhaust gases into a number of small segments. In addition, it has been proposed to obtain thrust reversal by the movement of blockage segments over the aft end of the nozzle as disclosed in United States Patent No. 2,874,538, granted February 24, 1959, to R. G. Laucher. In addition, a variable area nozzle can be incorporated with such a thrust reverser.

The present invention utilizes the Greatrex noise suppression principle but utilizes retractable noise suppression elements as well as retractable thrust reverser blockage segments. The noise suppression elements are hinged to the engine, and inward movement of the elements can change the shape of the jet nozzle from a circular configuration to a series of small separate jets affording noise suppression. These small separate jets provide an equal area to the total area of the single jet. In addition, slight movement of the noise suppression elements causes a variation in the exhaust area of the single jet to provide a variable area nozzle. The thrust reverser segments are carried by a movable shroud surrounding the exhaust nozzle, and movement of the shroud opens up the engine cowling to produce an ejector action to aid in noise suppression. Because of the realtionship of the various components of the invention, it is possible to use a single actuator for moving both the blockage segments and the noise suppression elements since the various conditions of the use of the invention are obtained by movement of the noise suppression elements and the thrust reverser blockage segments into predetermined relationships with respect to one another.

The present invention has the advantage over prior fixed, convoluted exhaust nozzles in that during normal cruise, the exhaust nozzle can have a substantially circular shape, providing a higher nozzle coefficient.

It is understood that the variable area feature could be eliminated from the present invention without affecting the combined noise suppression and thrust reversing features. Also, the retractable noise suppression elements can be utilized independently of the thrust reversing feature and provide an engine having minimum thrust loss during cruise because of the substantially circular optimum shape of the nozzle.

It is, therefore, an object of the present invention to provide a retractable noise suppressor for a jet engine in which nozzle area is changed from a single jet into a plurality of smaller separate jets by movable noise suppression elements.

Another object of the present invention is to provide a combined noise suppressor and thrust reverser in which noise suppression elements are movable into the jet stream and thrust reverser blockage segments are movable over the end of the nozzle to reverse the direction of thrust.

A further object of the present invention is to provide a combination noise suppressor, thrust reverser and variable area nozzle for a jet engine in which noise suppression is obtained by a plurality of elements movable into the exhaust stream, the initial movement of said elements providing for the variation in nozzle area.

These and other objects of the invention not specifically set forth above will become readily apparent from the accompanying description and drawings in which:

FIGURE 4 is a partial sectional view of the nozzle end of the engine showing the noise suppression elements in noise suppression position and the blockage segments in thrust reversal position.

FIGURE 5 is a partial view along line 5—5 of FIGURE 1 showing the noise suppression elements in their stowed position.

FIGURE 6 is a sectional view along line 6—6 of FIGURE 5 showing the seals for the noise suppression elements.

FIGURE 7 is a view along line 7—7 of FIGURE 4 showing the thrust reversal blockage segments in blocking position.

Figure 12:
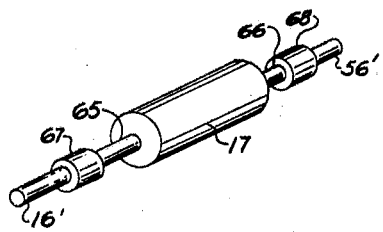
FIGURE 12 is a diagrammatic illustration of the power systems for the noise suppressor and thrust reverser actuators.

An embodiment of the invention is illustrated in connection with a jet engine 9 having a cowling 10 which is a fixed portion of the engine. A movable shroud 11 normally abuts the end of cowling 10 and is supported for movement rearwardly of the cowling by a plurality (preferably four) of rigid support rods 12 extending snugly into the interior of cowling 10. The rods 12 permit the shroud 11 to move from the stowed position of FIGURE 1 to the fully extended position of FIGURE 4 while remaining concentric about the central axis of the cowling 10. The movement of the shroud 11 is accomplished by a plurality of actuators 13 each having a shaft 14 connected by a fitting 15 to the shroud 11. A section of actuator drive cable 16 powers the actuator 13 for each shaft 14 from a central synchronized power source such as motor 17 (see FIGURE 12).

Figure 1:
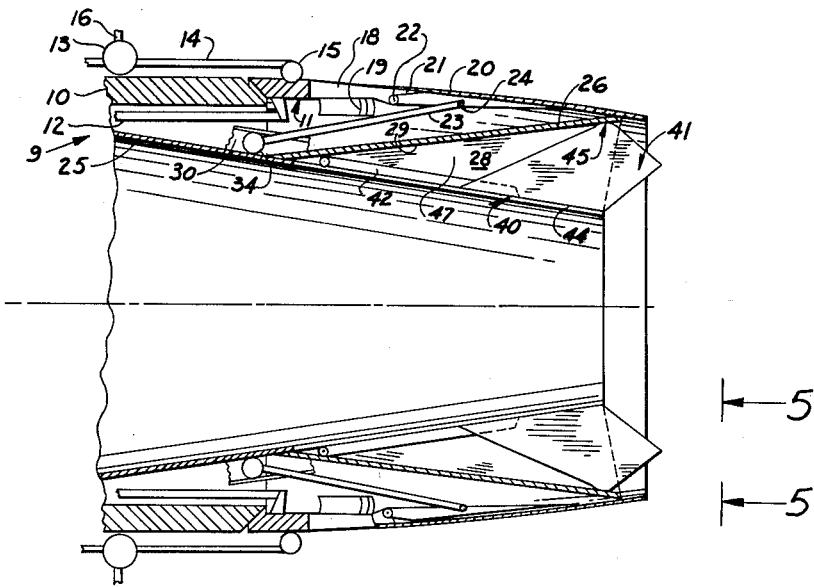
FIGURE 1 is a sectional view of the exhaust nozzle end of a jet engine showing the noise suppression elements and the thrust reverser blockage segments in the stowed position for normal cruise.
Figure 2:
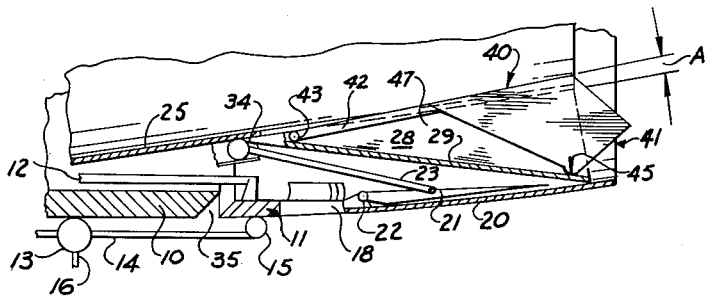
FIGURE 2 is a partial sectional view of the nozzle end of the engine showing the noise suppression elements in position to trim the area of the nozzle.
Figure 3:
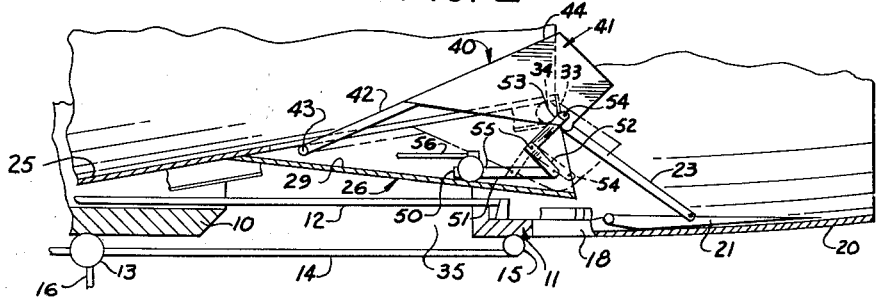
FIGURE 3 is a partial sectional view of the nozzle end of the engine showing the noise suppression elements in position to break up the exhaust flow.

The shroud 11 contains a plurality of openings 18, and a plurality of annular thrust reversing vanes 19 are located around the inner surface of the shroud adjacent these openings. A thin surface 20 of the shroud 11 covers a plurality of thrust reverser blockage segments 21 (ten being shown) and these pie shaped segments are pivotally secured to a mounting ring 22 carried by the shroud 11. As illustrated in FIGURES 1, 2 and 3, the blockage segments 21 normally extend longitudinally of the engine during rear movement of the shroud 11. However, at the furthest rear position of the shroud, each blockage vane 21 is pulled inwardly by a link 23 pivotally connected thereto by a pin 24. In the closed position of FIGURE 4, the blockage segments cover the aft end of the engine as illustrated in FIGURE 7.

The cowling 10 surrounds a conical surface portion of the nozzle 25. The aft end of nozzle 25 is formed of a plurality (ten being shown) of pockets 26 which increase in rectangular cross-section as they extend in the rearward direction. Each of the pockets 26 consists of triangular shaped sides 27 and 28 and a flat rectangular cover 29, and located between each of the pockets is a continuing portion 25a of the forward conical nozzle portion 25. Along each of the portions 25a extends a track comprised of a pair of angle irons 30 and 31 between which is a slot 32, and the open aft end of each track is closed by a bracket 33. Each of the tracks contains a pair of space rollers 34 connected by an axis 34a which is also pivotally connected to one end of a link 23. The other end of each link, as previously described, is connected to one of the blockage segments 21.

As illustrated in FIGURE 1, when the shroud 11 is in the stowed position, the rollers 34 are at the forward end of the track formed by the angle irons 30, 31, and the block segments 21 are in the outer position. As the shroud 11 is moved rearwardly by the actuators 13, the rollers 34 move in the tracks and the levers 23 move along the slots 32 until the shroud reaches the position illustrated in FIGURE 3 wherein the rollers 34 have engaged the end brackets 33. Thereafter, further rearward movement of the shroud 11 into the position shown in FIGURE 4 will move the blockage segments 21 inwardly about the ring 22 and into the full blockage position. When the shroud 11 is moved forwardly from the position of FIGURE 4, the blockage segments will first move outwardly under the influence of the exhaust gas and then the rollers 34 will move forwardly in the tracks until the normal stowed position of FIGURE 1 is again reached. During the rearward movement of the shroud 11, an opening 35 develops between the shroud and the cowling 10, which permits an ejector action to develop in the positions between FIGURE 2 and FIGURE 3, and further permits reverse discharge of exhaust gases caused by the blockage segments when in the position of FIGURE 4. This reverse flow of exhaust gases through opening 35 will, of course, produce a reverse thrust which serves to stop the aircraft which mounts the engine 9.

Figure 8:
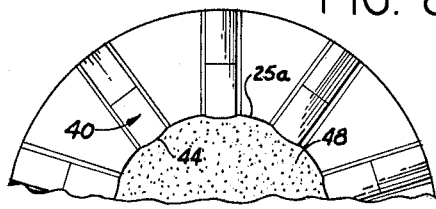
FIGURES 8, 9 and 10 are schematic illustrations of the aft end of the engine for cruise, cruise with trim, and noise suppression, respectively.

Each of the pockets 26 contains a noise suppression element 40 which comprises a body 41 pivotally connected by an arm 42 to a pivot pin 43 located in each of the pockets 26. Each body 41 has a width such that it is snugly received between the side walls 27 and 28 of each pocket 26. Bottom panels 44 of bodies 41 provide a continuing surface with the nozzle portions 25a when the elements 40 are in the raised position (see FIGURES 1, 5 and 8). Also, the apex 45 of each body 41 comprises a spring seal 46 which can extend outwardly to engage the top panel 29 of each pocket 26 during small inward movement of each element 40. Thus, in the raised position, seals 46 block the space 47 within each pocket 26, and the bodies 41 and surface portions 25a provide a substantially circular exhaust area 48 (see FIGURE 8).

Each of the noise suppression elements 40 is moved by an actuator 50 having a shaft 51 pivotally connected to an arm 52 which is rigid with an arm 53 and the arm 53 is connected by pin 54 to a body 41. The arms 52 and 53 are pivoted to a pocket 26 at point 55 so that they can be moved by the actuator from the dotted line position of FIGURE 3 wherein the elements 40 are stowed within the pockets 26, to the full line position with the elements 40 projecting into the jet stream to provide noise suppression. As illustrated in FIGURE 5, each actuator 50 is mounted on the side 28 of a pocket 26 and is driven by a flexible shaft section 56 which is connected with the same power source 17 as the flexible shafts 16 which drive the actuators 13.

Figure 9:
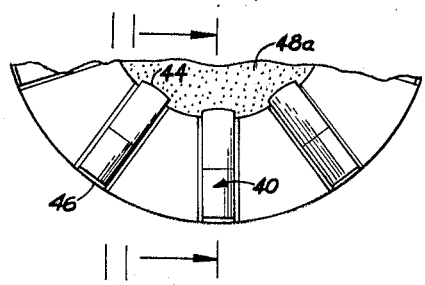

As previously explained, when the noise suppression elements 40 are in the raised position of FIGURE 1, the central single jet 48 of exhaust gas is discharged from the nozzle 25. This single jet is maintained when the elements 40 are moved into the position of FIGURE 2, since the springs 46 can move outwardly to maintain engagement with the top panel 29 of each pocket 26. The positions of the elements 40 corresponding to FIGURE 2 are illustrated in FIGURE 9, and it is apparent that the lower surfaces 44 have moved inwardly to reduce the exhaust area of the nozzle from the original open area 48 to the open area 48a. Since the actuators 13 and 50 are driven by the same power source, the shroud 11 has moved rearwardly somewhat in FIGURE 2 as the elements 40 are moved slightly inward. As previously stated, the spring seal 46 prevents exhaust flow through the pockets 26 during this variation of the nozzle area. Also, as illustrated in FIGURE 6, the sides 58 and 59 of the body portions 41 have slits 60 containing seal springs 61 to prevent exhaust gas leakage between the sides of bodies 41 of the pockets 26. Thus, the elements 40 can move within the angle A of FIGURE 2 to trim the nozzle area while maintaining a substantially circular jet configuration.

Figure 10:
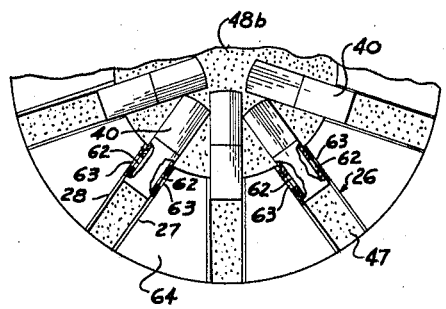
Figure 11:
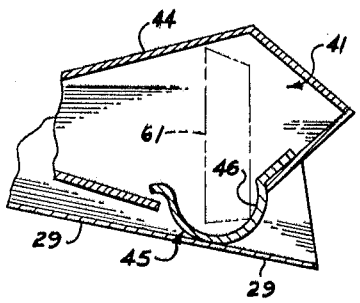
FIGURE 11 is a sectional view along line 11—11 of FIGURE 9 showing the spring seal for permitting nozzle trim.

Continued rearward movement of the shroud 11 increases the size of the opening 35 and at the same time, moves the elements 40 into the jet stream until the shroud reaches the position of FIGURE 3 wherein full noise suppression action is available. In this position, the exhaust gases are now directed through the spaces 47 of the pockets 26 and around the bodies 41 of the elements 40. Also, air is drawn through opening 35 by the ejector action of the jet and this air flows through spaces 64 between the pockets. Referring to FIGURE 10, it is noted that the actuators 50 cause alternate elements 40 to move further into the engine and the cross hatched areas of FIGURE 10 illustrate the interior space 48b and the spaces 47 through which the exhaust flows during noise suppression. By swinging the elements 40 into the center of the exhaust exit, the exhaust gases are broken up into a number of separate, smaller segments thereby increasing the contact area of the exhaust with the ambient air and greatly improving noise suppression. In addition, as illustrated in FIGURES 4 and 10, elements 40 contain openings 62 in side panels 58 and 59 which cooperate with openings 63 in side panels 27 and 28 of pockets 26 when the elements 40 are in the inward position to permit cooling air from the passages 64 to flow through alternate bodies 41 and exhaust into the center core of the primary exhaust gas pattern 48b through slits 60. In addition to cooling, the air discharged from bodies 41 serves to maintain substantial separation of the exhaust streams aft of the nozzle.

The exhaust pattern of FIGURE 10 is substantially the same with the shroud 11 in the positions of FIGURE 3 or FIGURE 4. In FIGURE 4, the shroud has been moved to its most rearward position in order to pull the segments 21 into blockage position and only slight further inward movement of the elements 40 results. Thus, in the position of FIGURE 4, the exhaust gases having the pattern of FIGURE 10 are diverted by the blockage segments 21 through the openings 18 and 35 in the side of the engine in order to obtain reverse thrust simultaneously with the operation of the noise suppressor elements 40.

It is understood that the motor 17 can drive the two shafts 65 and 66 at the same speed and these shafts connect, respectively, with gear reduction boxes 67 and 68. The main drive cable 16' for the shaft sections 16 connected with actuators 13, is driven by the output of gear box 67, and the main drive cable 56', which drives the cable sections 56 for the actuators 50, is driven by the output of the gear reduction box 68. As illustrated in FIGURE 4, the total movement of the shafts 14 of actuators 13 is substantially greater than the total movement of the shafts 51 of actuator 50 and the ratio between the speeds of main cables 16' and 56' is controlled by the gear boxes 67 and 68 in such a manner that the elements 40 reach their inward position when the shroud 11 reaches its rearward position of FIGURE 4. Thus, it is possible to utilize a single power source and synchronize the actuators for the elements 40 and for the blockage segments 21. It is apparent, however, that entirely separate drives for the actuators 13 and 50 can be utilized so that the relative position between the shroud 11, the segments 21, and the elements 40 can be varied as desired.

In view of the above discussion, it is apparent that during cruise, the nozzle area can be trimmed over the angle A and that during such operation, the engine cowling will be substantially closed. During take-off and approach to land, the blockage segments 21 would be up as shown in FIGURE 3 with noise suppression resulting from the inward position of the elements 40. For landing or upon an abortive take-off, the parts of the invention would be in the condition of FIGURE 4 to obtain full thrust reversal and noise suppression while the cowling is open.

Because of the requirements of various flight conditions, a single power source 17 can position the shroud 11, the segments 21 and the elements 40 into the cruise positions of FIGURES 1 and 2, or into the take-off and approach to land position of FIGURE 3, or into the landing or abortive take-off position of FIGURE 4. Various types of actuators can be utilized for the moving of the shroud 11 and the noise suppression elements 40, and various structures can be utilized to movably support the shroud and move the segments 21 and the elements 40. Various other modifications are contemplated by those skilled in the art without departing from the spirit and scope of the invention as hereinafter defined by the appended claims.

What is claimed is:

1. In a jet engine, a nozzle located at the aft end of said engine, a stationary cowling for the engine, a plurality of radially outwardly extending pockets formed in the aft portion of said nozzle and separated by surface portions of the nozzle extending from and continuous with the forward portion of the nozzle, a noise suppression element located in each of said pockets in sealing relationship thereto to prevent passage of exhaust gas through said pockets during cruise operation, means for supporting said elements for movement into and out of said pockets, actuator means for moving said elements inwardly into the exhaust jet in order to break up the exhaust stream into a plurality of small separate jets and thereby obtain noise suppression, a movable shroud located at the aft end of said cowling during cruise operation, and actuator means for moving said shroud rearwardly upon movement of said elements inwardly into said exhaust jet to provide an opening between the end of said cowling and said shroud through which ambient air can be drawn and passed through the space between said pockets by the ejector action of the exhaust jet.

2. In a jet engine as defined in claim 1 wherein each of said elements has inwardly directed side surfaces, at least some of said side surfaces containing side openings for passage of cooling air therethrough when said elements are in the inward, noise suppression position, and openings in said pockets cooperating with said side openings when said elements are in the noise suppression position to permit cooling air to flow from said space through said elements and maintain separation of the individual exhaust jets aft of the nozzle.

3. In a jet engine as defined in claim 1 having a plurality of movable blockage segments pivotally mounted on said shroud, means for connecting said segments to said nozzle to permit said segments to extend longitudinally of the engine until the shroud is moved to the aft end of the nozzle, and linkage means causing inward movement of said segments as said shroud moves beyond the end of said nozzle in order to reverse the flow of exhaust gas leaving the nozzle and discharge same through the opening between the cowling and the shroud.

4. A jet engine as defined in claim 3 wherein the extending portions of said nozzle each supports a track extending longitudinally between adjacent pockets, said linkage means comprising roller means located in said tracks, and a link connected at one end with said roller means and at the other end with one of said segments.

5. A jet engine as defined in claim 3 wherein said actuator means for said shroud and for said elements are separately driven by a common power source at a rate to position said shroud at the end of said nozzle when said elements are in the inward, noise suppression position and to move said shroud to the thrust reversing position with slight additional inward movement of said elements.

6. In a jet engine, a fully open nozzle located at the aft end of said engine, a plurality of radially outwardly extending pockets formed in the aft surface of said nozzle and separated by surface portions of the nozzle extending from and continuous with the forward portion of the nozzle, said surface portions being adjacent innermost portions of said pockets, a noise suppression element located in each of said pockets in sealing relationship thereto to prevent passage of exhaust gas through said pockets during engine cruise operation, means for supporting said elements for movement into and out of said pockets, and actuator means for moving said elements inwardly into the exhaust jet in order to break up the exhaust stream into a plurality of small separate jets and thereby obtain noise suppression, each of said elements having an inward surface adjacent said exhaust jet during cruise operation and located to be continuous with the extending surface portions of said nozzle to provide a fully open, substantially circular exhaust jet configuration during cruise, each of said pockets having an outer surface and side surfaces extending inwardly from said outer surface, said pockets having increasing rectangular cross section from said forward nozzle portion to the aft end of the nozzle, each of said elements having an outermost surface, a portion of which is located adjacent one of said pocket outer surfaces during cruise and movable inwardly with said element to define an exhaust space during sound suppression, each of said outermost surfaces being separated from said exhaust jet by an inward element surface during cruise operation, and a spring seal contained in each outermost surface portion, each of said seals being in engagement with the outer surface of one of said pockets for preventing exhaust gas flow through said pockets during small inward movement of said elements to provide nozzle trim during cruise.

7. In a jet engine, a fully open nozzle located at the aft end of said engine, a plurality of radially outwardly extending pockets formed in the aft surface of said nozzle and separated by surface portions of the nozzle extending from and continuous with the forward portion of the nozzle, said surface portions being adjacent innermost portions of said pockets, a noise suppression element located in each of said pockets in sealing relationship thereto to prevent passage of exhaust gas through said pockets during engine cruise operation, means for supporting said elements for movement into and out of said pockets, and actuator means for moving said elements inwardly into the exhaust jet in order to break up the exhaust stream into a plurality of small separate jets and thereby obtain noise suppression, each of said elements having an inward surface adjacent said exhaust jet during cruise operation and located to be continuous with the extending surface portions of said nozzle to provide a fully open, substantially circular exhaust jet configuration during cruise, each of said pockets having an outer surface and side surfaces extending inwardly from said outer surface, said pockets having increasing rectangular cross section from said forward nozzle portion to the aft end of the nozzle, each of said elements having an outermost surface, a portion of which is located adjacent one of said pocket outer surfaces during cruise and moveable inwardly with said element to define an exhaust space during sound suppression, each of said elements having inwardly directed side surfaces extending between an inward element surface and an outermost element surface, at least some of said side surfaces containing side openings for passage of cooling air therethrough, and openings in said pockets cooperating with said side openings when said elements are in the noise suppression position for introducing cooling air into said elements.

References Cited in the file of this patent

UNITED STATES PATENTS

| | | |
|---|---|---|
| 2,940,252 | Reinhart | June 14, 1960 |
| 2,952,124 | Pearson | Sept. 13, 1960 |
| 3,032,981 | Lawler | May 8, 1962 |

FOREIGN PATENTS

| | | |
|---|---|---|
| 220,505 | Australia | Nov. 7, 1957 |